United States Patent [19]

Orsburn

[11] Patent Number: 4,597,006
[45] Date of Patent: Jun. 24, 1986

[54] VIDEO SIGNAL CONTROL SYSTEM

[75] Inventor: Michael L. Orsburn, Cooper City, Fla.

[73] Assignee: VTA Technologies, Inc., Hollywood, Fla.

[21] Appl. No.: 495,783

[22] Filed: May 18, 1983

[51] Int. Cl.$^4$ .................................. H04N 9/64
[52] U.S. Cl. ................................ 358/22; 358/29; 358/54; 358/80
[58] Field of Search ............... 358/29, 80, 54, 76, 358/22, 21 R

[56] References Cited

U.S. PATENT DOCUMENTS

| | | | |
|---|---|---|---|
| 2,244,958 | 6/1941 | Moross | 201/55 |
| 2,554,811 | 5/1951 | Bromberg et al. | 201/60 |
| 2,660,613 | 11/1953 | Young | 178/5.2 |
| 2,697,218 | 12/1954 | Glenny | 340/345 |
| 2,876,318 | 3/1959 | Stratton | 201/48 |
| 2,894,236 | 7/1959 | Jopson | 338/116 |
| 2,929,258 | 3/1960 | Mackway | 74/471 |
| 2,954,707 | 10/1960 | Kalous | 74/504 |
| 3,054,297 | 9/1962 | Wells et al. | 74/3.5 |
| 3,134,086 | 5/1964 | Caddock et al. | 338/196 |
| 3,428,887 | 2/1969 | Miller | 323/94 |
| 3,558,806 | 1/1971 | Monahan | 178/5.4 |
| 3,637,920 | 1/1972 | Becker et al. | 338/116 |
| 3,893,166 | 7/1975 | Pugsley | 178/5.4 |
| 3,970,774 | 7/1976 | Bazin et al. | 178/6 |
| 4,047,145 | 9/1977 | Schwehr | 338/67 |
| 4,069,432 | 1/1978 | Bazin | 307/357 |
| 4,096,523 | 6/1978 | Belmares-Sarabia et al. | 358/80 |
| 4,123,740 | 10/1978 | Palmer et al. | 338/67 |
| 4,168,468 | 9/1979 | Mabuchi et al. | 325/37 |
| 4,223,343 | 9/1980 | Belmares-Sarabia et al. | 358/54 |
| 4,410,908 | 10/1983 | Belmares-Sarabia et al. | 358/30 |
| 4,418,358 | 11/1983 | Poetsch et al. | 358/80 |

OTHER PUBLICATIONS

TK-47B and TK-48, RCA Corporation, Jun. 1983.
Smart Remote Control Unit Display Module, RCA Corporation, Mar. 1983.
Smart Remote Control Unit Switch Module, RCA Corporation, Dec. 1984.
Smart Remote Control Unit Computer Module, RCA Corporation, Dec. 1984.
Smart Remote Control Unit Description Operation Maintenance, RCA Corporation, Aug. 1983.
Multiple Event Programmer for TK-29C Telecine Camera Type PA-3000, RCA Corporation, (date unknown).
Corporate Communications Consultants, Inc., "The System 60B", 1982.
Corporate Communications Consultants, Inc., "The System 60XL", 1982.
Corporate Communications Consultants, Inc., "Thor MC 1", 1982.
Corporate Communications Consultants, Inc., "The System 30", 1982.

*Primary Examiner*—Michael A. Masinick
*Attorney, Agent, or Firm*—Jones & Askew

[57] ABSTRACT

A video signal control system including circuitry for providing a plurality of independent color video signals, control circuitry for separately varying the magnitude of each of the independent color video signals, circuitry for combining the controlled independent color video signals to provide change-in-red, change-in-blue, and change-in-green, and change-in-luminance correction signals, and second combining circuitry for adding together the correction signals with conventional video signals to provide corrected video signals. The system thereby provides independent control over portions of a video scene which are predominantly the color of the independent color channel, without affecting spectral content, neutral tones, and color mixtures. The present invention also includes an improved apparatus for controlling parameters requiring repetitive adjustments, including operator signal means responsive to provide control signals indicative of a desired increase or decrease in the controlled parameter. Circuitry responsive to the control signals accumulating the net increase or decrease in the controlled parameter in a memory location associated with the particular controlled parameter, in a manner such that no physical movement or resetting of the operator signal means is required in order to condition the apparatus to accept changes for a subsequent event.

14 Claims, 9 Drawing Figures

VIDEO SIGNAL CONTROL SYSTEM

TECHNICAL FIELD

The present invention relates generally to systems for the correction and control of video signals, and relates more particularly to a color video signal correction system which allows correction of a control parameter of a video event without requiring physical movement or physical resetting of an operator's control.

BACKGROUND

Frequently in the television industry it is desirable to convert motion pictures or other image media such as video tape into video signals for recording or for transmission of the images to a viewing audience. Many technical problems are encountered in converting the motion picture images into video signals, including problems in the spectral response of the color dyes in the film, the characteristics of the telecine, and the fact that the characteristics of the photographic film are not matched to the electronic components used in the telecine or "film chain". Especially, problems are encountered in insuring that the spectral content of the resultant video signals are aesthetically acceptable and that the luminance or monochrome portion of the video signal provides an acceptable black and white image when reproduced on monochrome equipment.

One proposal for a color correction system for use in a film chain is shown in U.S. Pat. No. 4,096,523 to Belmares-Sarabia et al. In this system, color corrections are made in the video signals by adjusting the color hue and saturation, and by varying the proportions of the primary color video signals to form a composite luminance signal. The entire film is color-corrected by providing incremental adjustment signals which are added to or subtracted from standard values for each different scene in the film. The incremental adjustment values are stored in a computer memory associated with an event number, which is in turn associated with the count of the frame in the film at which the color correction was made.

After a series of color corrections have been made, a video tape recording of the color-corrected video signals is produced by re-running the motion picture film, video tape, or other video media through the system, while the color correction incremental adjustment signals are recalled from memory and added to the signals produced during the running of the film. The resultant color-corrected composite video signals are then re-corded on the video tape recorder.

The Belmares-Sarabia patent discloses means for automatically returning the color potentiometers for color parameters and luminance correction quickly to a starting position in preparation for another color correction. The control potentiometers are adapted to be moved from a starting position to vary the magnitude of one of the color components. Magnetic positioning devices are used to reset the potentiometers to the zero or null position at the start of the next color correction, during the vertical video interval. A DC pulse from the control circuitry provides an electromagnetic field in the magnetic positioning device in response to actuation of a "mark event" pushbutton in coincidence with the vertical sync signal. The potentiometers are then returned by the magnetic positioning device to the starting positions regardless of whether the potentiometers have been turned clockwise or counterclockwise. The values represented by the settings of the potentiometers are stored in a memory so that when the motion picture film is re-run, those values can be recalled from memory in order to effectuate the color correction.

While the system shown in this patent conveniently allows repetitive corrections to be made without forcing tedious and repetitive manual resetting of the potentiometers, the apparatus is basically electromechanical in nature and requires large amounts of energy in surges to simultaneously reset all of the potentiometers. Accordingly, the mechanical resetting of the potentiometers is noisy, energy inefficient, and imparts vibrations to the components which shortens the life of other electronic components.

The prior art does not provide a color correction system including control or adjusting means for adjusting the spectral content or other parameters, which means does not suffer from the disadvantage that components must be physically and mechanically returned to a starting position in preparation for a second and subsequent color correction.

Another difficulty encountered in the use of the color correction system shown in the Belmares-Sarabia patent occurs when it is desired to return to a previously-made scene correction and re-correct one or more parameters of that scene. In order to accomplish this task with the apparatus shown in the patent, it is necessary to recall from memory the correction values associated with the frame count for which a revised correction is desired. Ideally, the effects of these recalled correction values should be displayed on the color monitor superimposed on the scene being re-corrected, but there appears to be no provision for resetting the correction potentiometers to the stored correction values other than by manual resetting; the automatic-return magnetic positioning devices appear to be unable to set the potentiometers to a predetermined, stored setting.

SUMMARY OF THE INVENTION

The present invention provides apparatus for controlling a controlled parameter such as the magnitude of the primary or complementary independent color video signals, in a color correction system where repetitive manual adjustments are required in correcting the spectral content and luminance of a motion picture or other video media. Accordingly, the present invention comprises operator signal means responsive to actuation by an operator for providing a direction signal indicative of a desired increase or decrease in the controlled parameter, and also for providing an "amount" signal indicative of a predetermined incremental amount of desired change to the controlled parameter.

In a preferred embodiment, a rotary position encoder, coupled to a control knob, provides pulses which may be analyzed as to direction and amount of rotation. Circuitry responsive to the direction signal and the amount signal causes a memory location associated with the particular controlled parameter to increment or decrement to reflect the net increase or decrease in the controlled parameter. The depression of a "mark" switch on the control panel causes the generation of a mark signal, which denotes the completion of the color or luminance correction desired for the present event. The operator depresses the mark switch when he is satisfied with the present adjustment or correction and desires to record and preserve the adjustment made. After the depression of the mark switch, the circuitry advances to memory locations reserved for a subsequent event, and conditions the system to receive subsequent adjustments for a subsequent event.

Advantageously, there is no physical movement of the rotary encoders after a correction has been made, since the correction indicated by the movement of the encoder is stored electronically and the memory location which stores the correction is electronically advanced. Moreover, since the rotary encoder provides a signal which does not represent an absolute amount of correction desired, the apparatus can selectively assign an increment of movement to be any predetermined amount, depending upon the operator's desires. For example, the operator can select a variety of scalings through a "ratio feature", whereby the full range adjustment can be accomplished for example in one complete revolution for coarse control, or three, or any other number of complete revolutions for fine control. This allows a precision of adjustment heretofore not taught or suggested in the prior art.

It is object of the present invention to provide an improved apparatus for controlling parameters such as the spectral content and luminance levels of the primary and complementary colors in a color correction system which requires repetitive manual adjustments.

It is another object of the present invention to provide an apparatus for controlling a parameter requiring repetitive manual adjustments wherein the increase or decrease in amount of correction is derived from signal means which need not be physically returned to a starting position in preparation for a subsequent correction of the controlled parameter.

It is another object of the present invention to provide an improved apparatus for controlling a controlled parameter requiring repetitive manual adjustments wherein after an adjustment is indicated by an operator by movement of a control knob, the amount of control is stored in a memory and utilized, and the apparatus is automatically conditioned for subsequent adjustments for a subsequent event without requiring physical movement of the control knob.

These and other objects, features and advantages of the present invention may be more clearly understood and appreciated from a review of the following detailed description of the disclosed embodiment and by reference to the appended drawings and claims.

DETAILED DESCRIPTION OF THE PREFERRED EMBODIMENT

Figure 1A:
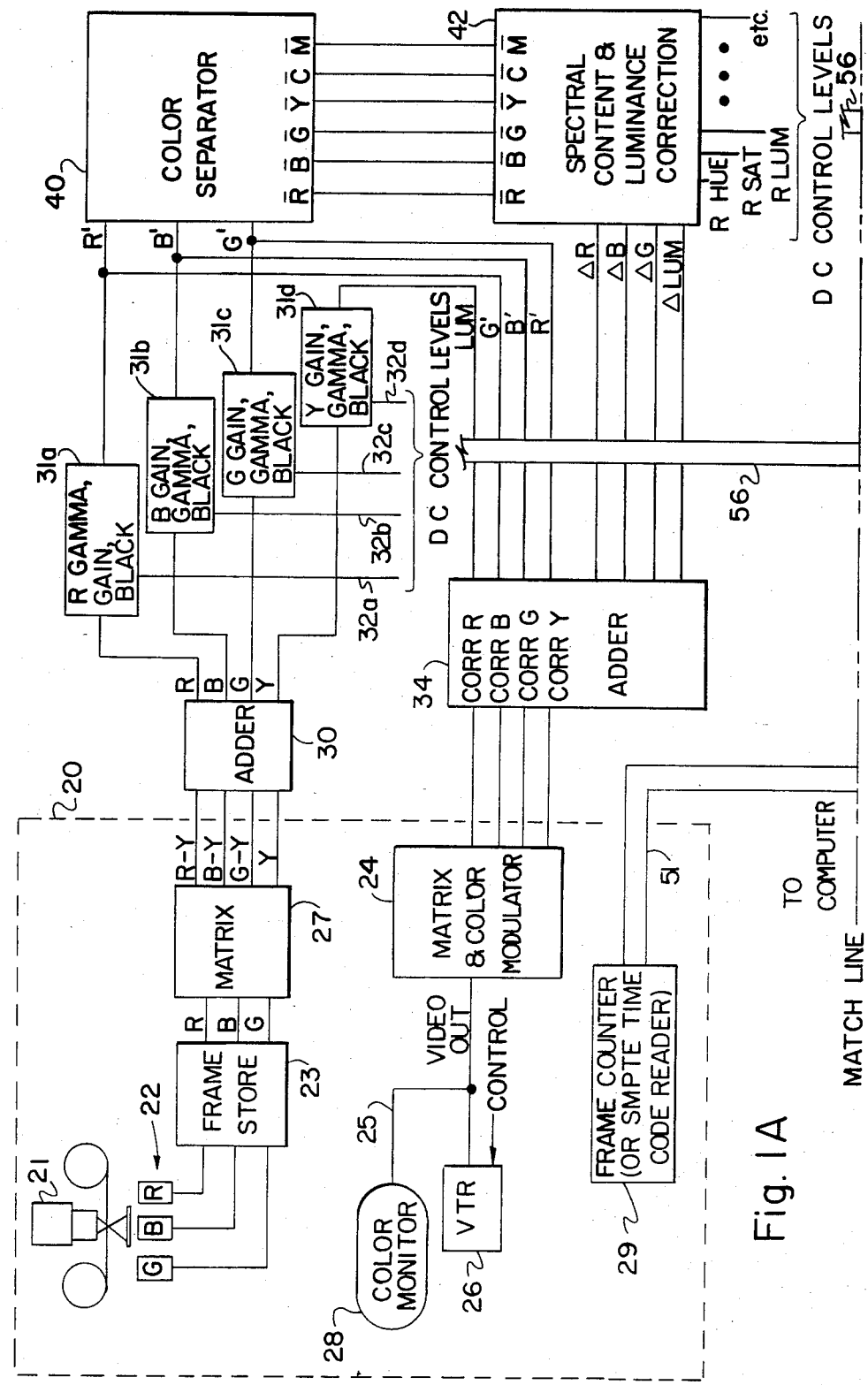
FIG. 1 is a schematic block diagram of a video color correction system incorporating the improved luminance and spectral content correction and control apparatus of the present invention.
Figure 1B:
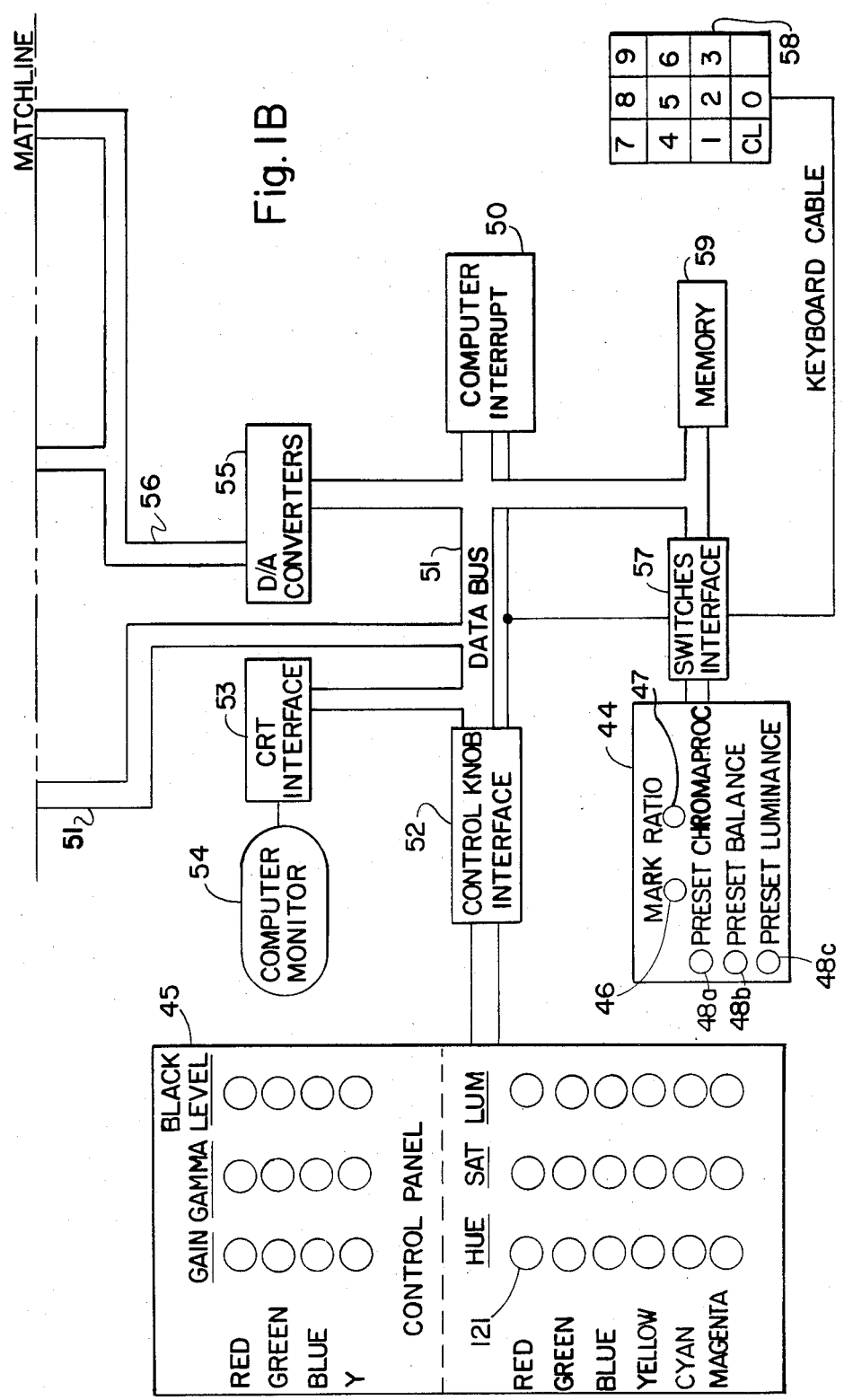

Referring now to the drawings, in which like numerals indicate like elements, FIG. 1 shows a block schematic diagram of a color correction system employed in connection with a conventional motion picture telecine 20. The disclosed embodiment employs a Bosch model FDL-60 telecine. The present invention receives signals from telecine 20 designated R-Y, B-Y, G-Y and Y, the primary color channels which have been matrixed with the luminance signal Y, performs spectral content correction and luminance correction, and provides corrected signals designated CORR R, CORR B, CORR G, and CORR Y.

As will be understood by those skilled in the art, the telecine 20 comprises a projector 21 which projects the photographic images recorded on film onto the video pick-up devices 22, such as orthicon tubes, charge-coupled devices, and the like, which produce the primary color video signals R, B and G. It will also be understood that a video tape recorder or other video image device can be employed in place of a motion picture telecine, and that control of color corrections can be made to the signals provided by these other devices. The primary color video signals R, B, and G are then provided to a frame storage circuit 23, which stores a video frame for viewing by the operator. The outputs from frame storage circuit 23 are provided to a matrix 27, which combines the R, B and G signals in the known manner to produce a standard luminance signal Y, which is then subtracted from each of the primary color video signals to provide the outputs R-Y, B-Y and G-Y.

The telecine 20 further includes a second matrix or color modulator 24, which receives the corrected video signals CORR R, CORR B, CORR G, and CORR Y, and converts these signals into the standard I and Q signals suitable for combination with the luminance signal for color modulation to form the video signal. The output of matrix and color modulator 24 is a composite color video signal VIDEO OUT provided on line 25 to a video tape recorder (VTR) 26, and is displayed on a color monitor 28. A frame counter 29 holds the frame count of the film being color corrected, and provides a twenty-four bit frame count to the control computer. For systems for color correction of video tape or other video media, a conventional SMPTE time code reader or similar frame identifying device would be employed for frame counter 29.

The signals R-Y, B-Y, G-Y and Y from telecine 20 are then provided to an adder 30 which recombines the signals in order to obtain a conventional red, blue, green and luminance channel, designated R, B, G, and Y. These signals are in turn provided to gamma, gain, and black control circuits 31a–31d, wherein the gamma, channel gain, and black levels for each channel are controlled. These parameters are controlled by DC control levels provided on lines 32a–32d from other circuitry. The outputs of gamma, gain, and black control circuits 31a–31d are the gamma-corrected primary color video signals R', B' and G', and the gamma-corrected luminance signal LUM.

Each of the signals R', B' and G' are provided to an adder 34, and also to color separator circuit 40, which is described in detail in connection with FIG. 2. The luminance signal LUM is provided to adder 34 where it will be corrected as hereinafter described.

The color separator 40 is a matrixing apparatus which linearly mixes the gamma-corrected primary color video signals and provides independent primary and complementary color signals. Such a matrixing apparatus is shown in U.S. Pat. No. 3,558,806 to Monahan, the disclosure of which is incorporated herein by reference. As will be shown in FIG. 2, the color separator 40 provides six independent primary and complementary color signal channels R, B, G, Y, C and M, which correspond to the primary colors red, blue, and green, and the complementary colors yellow, cyan, and magenta, respectively.

Each of the independent primary and complementary color signals are then provided to a spectral content and luminance correction circuit 42. This circuit, which is shown in more detail in FIG. 4, receives DC control levels for hue, saturation and luminance for each of the independent primary and complementary color channels, so as to effectuate spectral content and luminance correction. Correction signals for each of the primary color channels and for the luminance signal are provided as the signals ΔR, ΔB, ΔG, ΔLUM, which are then provided to adder 34 where they are recombined with the gamma-corrected primary color signals R', B', G' and LUM. The outputs of adder 34 are the corrected primary color video signals and the corrected luminance signal Y, designated in FIG. 1 as CORR R, CORR B, CORR G, and CORR Y.

Control over the hue, saturation, and luminance corrections for each of the primary and complementary colors, as well as over the gain, gamma and black levels of the primary color channels, is made through a control panel 45. A plurality of operator control knobs are provided in the control panel for actuation by an operator as a particular video scene provided by the telecine is viewed on the color monitor 28. As seen in FIG. 1, there is provided a gain, a gamma and a black level control knob for each of the primary color channels red, green and blue, as well as for the luminance signal Y (prior to correction). There is also provided a hue control knob, a saturation control knob, and a luminance control knob for each of the independent primary and complementary color channels red, green, blue, yellow, cyan and magenta.

There is also provided a switch panel 44, which includes various control switches such as "mark" switch 46, "ratio" switch 47 (the latter allowing the selection of different scalings for the control knobs), and "memory preset" switches 48a, 48b, and 48c.

A programmed microcomputer 50 is employed in the preferred embodiment to detect the movement of the control knobs and the actuation of the various switches, and to convert the settings of the control knobs into the DC control levels which are provided to the gamma, gain, and black control circuits 31a-31d, and to the spectral content and luminance correction circuit 42. In the preferred embodiment, an Apple II brand microcomputer board is employed. The computer 50 sends and receives signals over data bus 51 to the various peripheral circuitry. A control panel interface circuit 52 receives signals provided by the actuation of control knobs in the control panel 45 and converts these signals into computer-readable form. A CRT interface 53 is also connected to the data bus 51 and allows computer 50 to display on a computer monitor 54 the amount of control indicated on the control panel.

A digital to analog converter circuit 55 is also connected to the data bus 51 and converts signals provided by microcomputer 50 into voltage levels which are provided on lines 56 as the DC control levels which are used to control the gain, gamma, black level, color balance and luminance corrections.

A switch interface 57 provides signals to the computer from the actuation of one of the switches in switch panel 44, or key pad 58 which is used to provide numerical input for scaling control. Random-access memory 59 stores the color correction values in locations associated with the frame count of the scene being corrected.

COLOR SEPARATION

Figure 2:
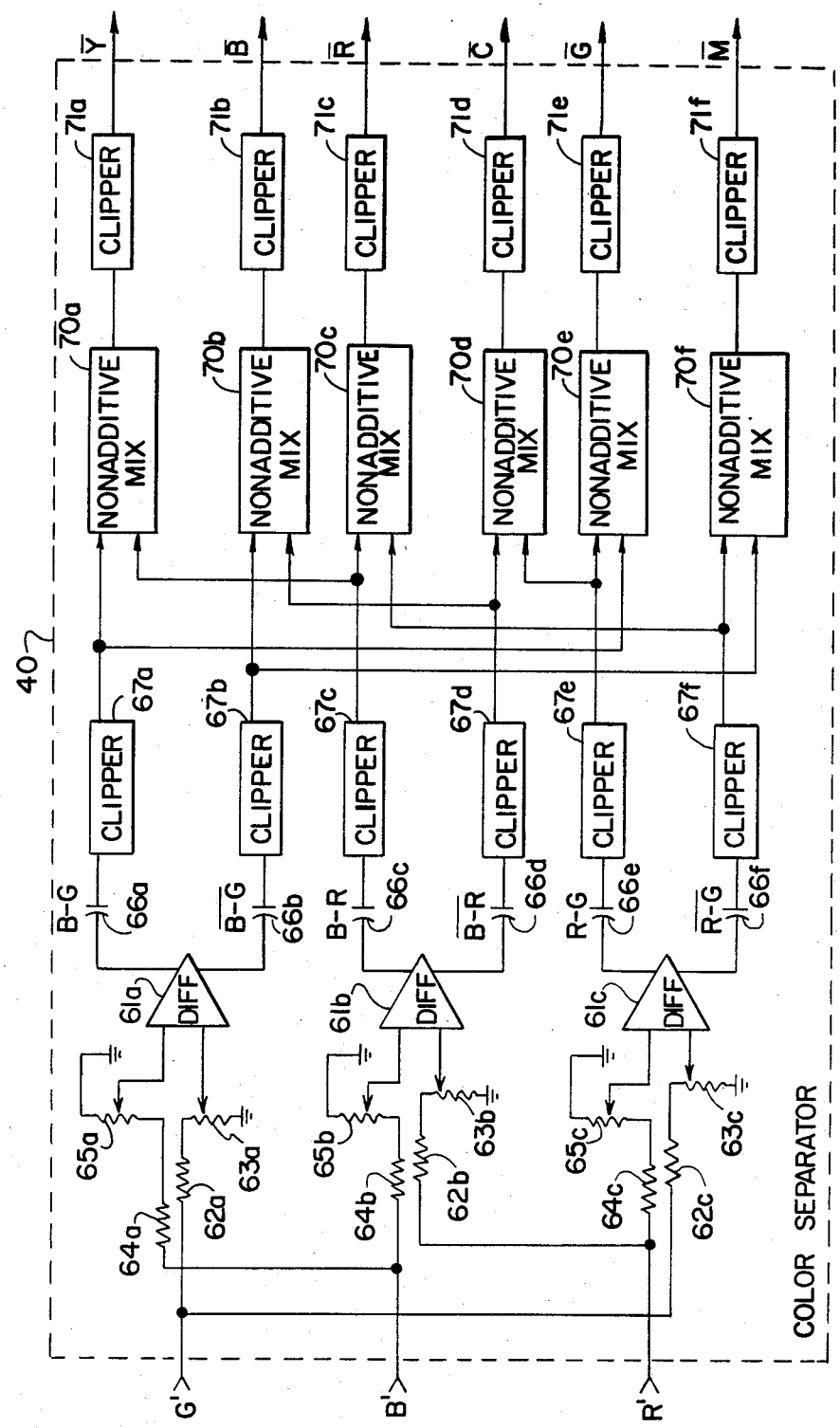
FIG. 2 is a schematic block diagram of the color separator employed to obtain the independent color video signals.

Turning now to FIG. 2, there will now be described the color separator circuit 40 which is employed in the preferred embodiment to obtain the independent primary and complementary color signals R, B, G, Y, C and M. The gamma-corrected primary color video signals R', B', and G' are provided to the color separator 40 and are first subtracted from each other in order to obtain color difference signals. The difference signals are obtained by the use of conventional difference amplifiers 61a-61c such as the type CA3001 video and wide-band amplifier manufactured by RCA Corporation.

For example, amplifier 61a receives the G' and B' signals and forms the difference signals B−G and $\overline{B-G}$. The signal G' is provided through input resistor 62a and trim potentiometer 63a to one input of amplifier 61a, while the signal B' is provided through input resistor 64a and trim pot 65a to the other input of amplifier 61a. In a similar fashion, the difference signals B−R, $\overline{B-R}$, R−G, and $\overline{R-G}$ are provided from difference amplifiers 61b and 61c.

Each of the difference signals is then provided through a filter capacitor 66 which passes video frequencies to a clipper 67 which clips the positive half of the signals. The clipped color-difference signals are then provided to a series of non-additive mixers 70a-70f which combine the difference signals so as to form the independent color signals. A non-additive mixer is shown in the incorporated U.S. Pat. No. 3,558,806 to Monahan, and will be known to those skilled in the art. The outputs of the non-additive mixer circuits 70a-70f are then clipped again by clippers 71a-71f to provide the independent primary and complementary color signals R, B, G, Y, C and M.

Figure 3:
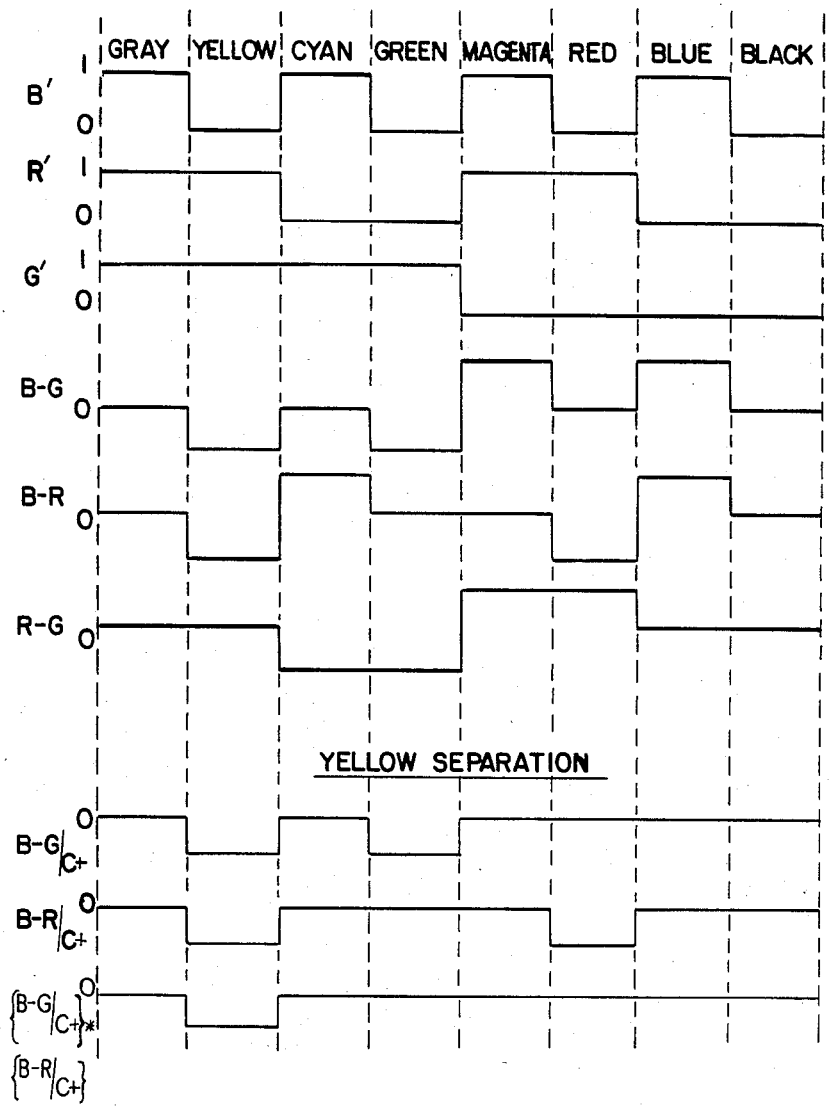
FIG. 3 is a color bar timing diagram showing the exemplary derivation of the independent yellow color signal.

As an aid in understanding the color separation which is accomplished by the circuitry in FIG. 2, it is helpful to examine FIG. 3. This figure illustrates the formation of the independent yellow signal from the primary gamma-corrected signals R', B' and G'. The top three lines illustrate a color bar video signal including the colors gray, yellow, cyan, green, magenta, red, blue, and black. Since yellow is a color mixture of red and green, in order to obtain the independent yellow signal it is necessary to combine the color difference signals in such a fashion as to isolate the red and green information. Observe that the signal R-G for the yellow color bar is zero, signifying that yellow comprises an equal mixture of red and green. Accordingly, the difference signals B-G and B-R are positive-clipped as shown in the lower portion of the figure. When the clipped signals B-G and B-R are passed through a non-additive mixer, only the less negative of the two inputs are passed, thereby producing a voltage output. Since for the color yellow there is a negative-going signal in both the B-G and the B-R channels, both will be passed, indicating that the color mixture of red and green to create yellow will provide a voltage signal in the independent yellow channel.

Those skilled in the art will understand that independent color signals for cyan, green, magenta, red and blue are likewise created by appropriate clipping and non-additive mixtures of the color difference signals. Importantly, it should be noted that a signal is present in each of the independent color channels only when the color information is predominantly the color of the particular channel. For example, even though yellow is a color mixture of red and green, there will be no appreciable signal in either the independent red channel or the independent green channel since the color information is predominantly a color mix, yellow. Accordingly, use of the independent color signals as hereinafter described provides advantages of control not heretofore possible.

SPECTRAL CONTENT CORRECTION

Figure 4:
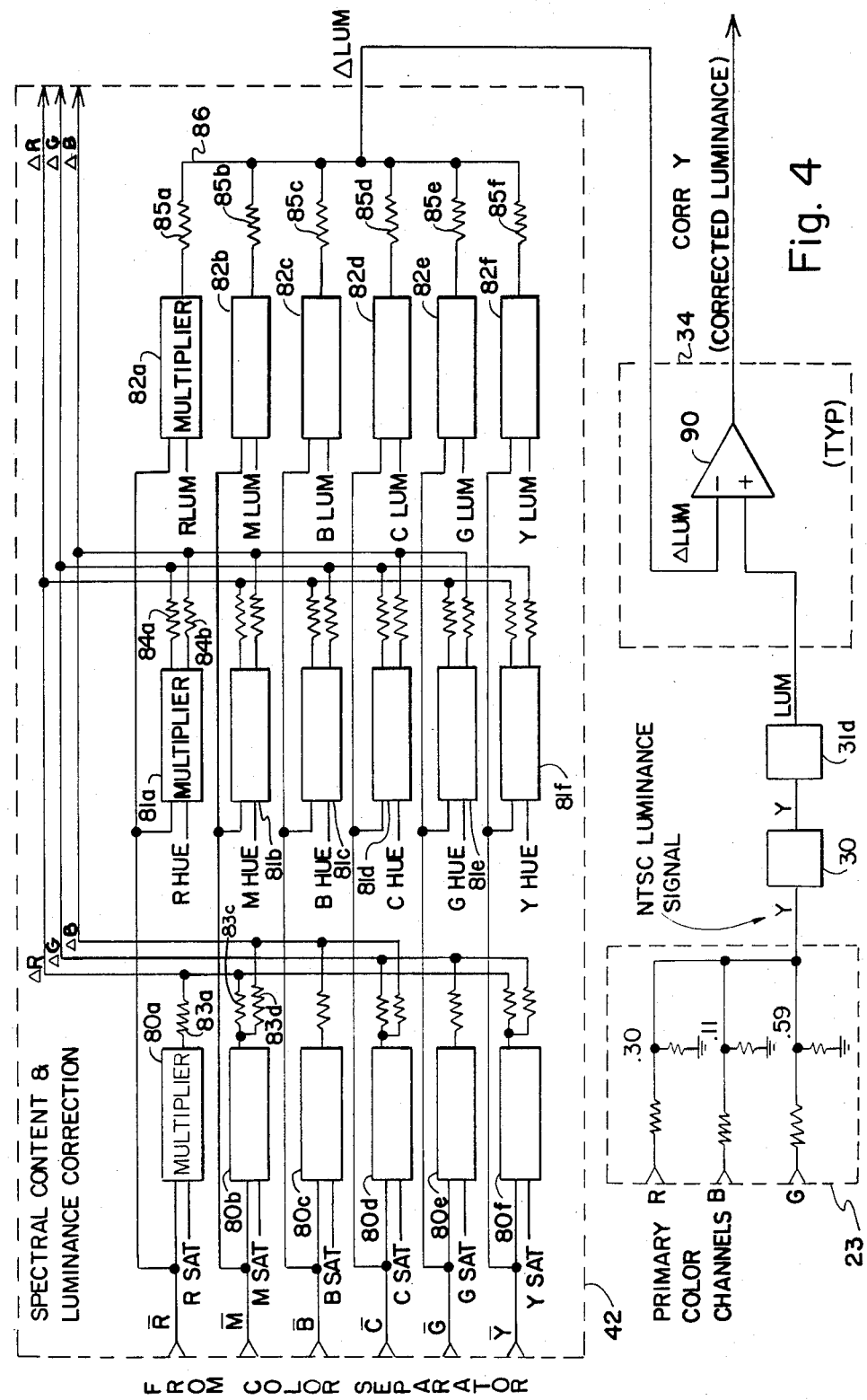
FIG. 4 is a schematic block diagram of the spectral content and luminance correction circuit of the present invention.

FIG. 4 illustrates the spectral content and luminance correction circuitry 42 used in the preferred embodiment to form the primary color correction signals and the luminance correction signal. The independent primary and complementary color signals are provided as inputs to the spectral content and luminance correction circuit 42. Also provided as inputs are the DC control levels which are used to control the hue, saturation, and luminance of each of the independent primary and complementary colors. For example, the independent red signal is provided to one of the inputs of a multiplier circuit 80a, to one of the inputs of a second multiplier circuit 81a, and to one of the inputs of a third multiplier circuit 82a. A DC control level R SAT, which designates the saturation or gain control for the independent red channel, is provided to the other one of the inputs of multiplier 80a. A DC control level designated R HUE is provided to the other one of the inputs of multiplier 81 and controls the hue of the independent red channel. A DC control level signal designated R LUM is provided to the other input of multiplier 82a and controls the luminance contribution of the independent red channel. In a similar fashion, each of the independent primary and complementary color signals are provided to one input of saturation, hue, and luminance multiplier circuits 80b–80f, 81b–81f, and 82b–82f, with similar DC control levels for saturation, hue, and luminance provided to the other multiplier input.

The effects of hue and saturation control are manifested as the signals ΔR, ΔG, ΔB, which are correction signals which are added to the gamma-corrected signals in adder 34 to obtain the corrected primary color signals. For example, in the independent red channel, the output of multiplier 80a is connected to the ΔR line through an impedance matching resistor 83a. On the other hand, the output of the saturation multiplier 80b for the independent magenta channel is connected through impedance matching resistors 83c and 83d to both the ΔR and ΔB channels since magenta is a color mixture of both red and blue. It will therefore be appreciated that the control of saturation for the remaining independent primary and complementary colors are provided in a similar manner. It will also be understood that each of the ΔR, ΔB, and ΔG lines, since they are summing junctions, form means for combining signals from the separately variable independent color channels.

The hue controls for the independent color channels are also implemented in a similar manner. For example, for the independent red channel, the output of hue multiplier 82a is coupled through impedance matching resistors 84a and 84b to the ΔG and ΔB lines. Since the hue of red is desired to be controlled, it will be appreciated that by increasing or decreasing the amount of green and blue in the video signal the color balance will be changed, altering the hue. Similarly, the magenta hue can be controlled by altering in equal amounts the signal applied to the ΔR and ΔB lines by a M HUE control level provided to the magenta hue multiplier 81b. It will now be appreciated that the hues of the remainder of the primary and complementary colors are controlled by DC control levels provided to the inputs of multipliers 81c–81f, the outputs of which are coupled to the lines ΔR, ΔG, and ΔB in the above manner, which allows alteration of the proportions of the primary colors to affect hue.

It should be noted that the correction signal lines ΔR, ΔB, and ΔG each are connected to seven multiplier circuits. For example, the R line is connected to multipliers 80a, 80b, 80f, 81b, 81c, 81e, and 81f. In the RCA Color Corrector A, on the other hand, each of the signals ΔI and ΔQ are connected to twelve multiplier circuits. Accordingly, it will be appreciated that the additive noise for the correction signals in the preferred embodiment is minimized over the RCA approach due to the creation of the composite correction signal by five fewer circuits. Moreover, it will be appreciated that the formation of change-in-primary color video signals prior to matrixing provides a lower component count than in the Belmares-Sarabia system, which has several matrix circuits and other components, and also facilitates the adaptation of the present invention to video system which provide uncorrected R, B, and G signals.

LUMINANCE CORRECTION

In the present invention, luminance correction is effectuated by providing DC control levels to multipliers 82a–82f, which provide outputs which are combined to provide a change-in-luminance signal ΔLUM. For example, to control the luminance in the independent red channel, the DC control signal R LUM is provided to one input of independent red channel luminance multiplier 82a. The output of multiplier 82a is provided through an impedance matching resistor 85a to a summing junction 86. Similarly, and for each of the remaining primary and complementary color channels, DC control levels designated M LUM, B LUM, C LUM, G LUM and Y LUM are provided to the inputs of multipliers 82b–82f, and the outputs are provided through resistors 85b–85f to summing junction 86, where the composite change-in-luminance or ΔLUM signal is formed. It will of course be understood that the summing junction 86 serves as means for combining the separately variable independent color channels to form the ΔLUM signal.

The ΔLUM signal, as well as the change-in-color balance signals ΔG, ΔR and ΔB, are then provided to adder 34, an exemplary portion of which is illustrated in FIG. 4. With specific reference to the luminance correction portion, it may be seen that the luminance correction signal ΔLUM is provided to one input of a differential amplifier 90, while the other input, the gamma-corrected standard luminance signal LUM, is received from the gamma, gain and black control circuit 31d. It will be recalled from FIG. 1 that the luminance signal LUM is derived from adder 30 and comprises the NTSC standard luminance signal Y having the predefined portions of red, blue, and green which have been established as the conventional luminance signal. The luminance correction signal ΔLUM is then added with the luminance signal LUM in adder 34, a portion of which is shown in FIG. 4. In particular, the signals are combined in amplifier 90, which in the preferred embodiment is a conventional differential amplifier which can be constructed with discrete transistors or commercially available integrated circuits. The output of amplifier 90 is the corrected luminance signal designated CORR Y, which is provided to the matrix and color modulator circuit 24. It will be understood that the signals ΔR, ΔB, and ΔG are added to the gamma-corrected primary color video signals R', B' and G' in adder 34 by video amplifiers such as shown at 90 for the luminance signal. It will also be understood that such amplifiers serve as means for combining the ΔR, ΔB, ΔG and ΔLUM signals with the R, B, G and LUM signals, respectively.

Figure 5:
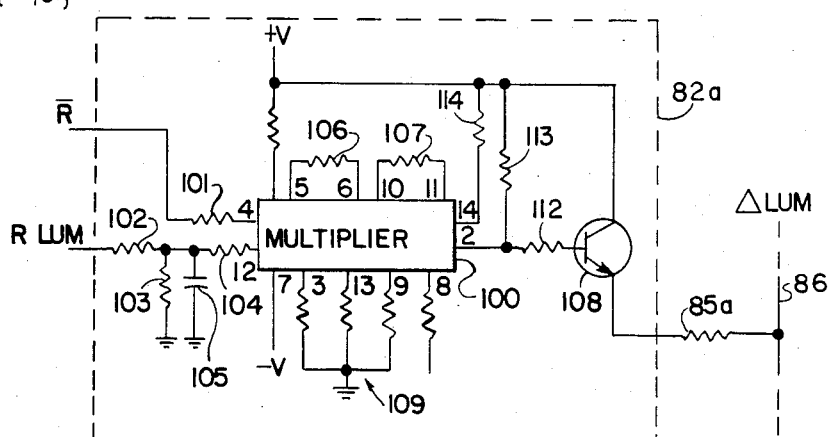
FIG. 5 is a detailed schematic diagram of a typical multiplier circuit used in the preferred embodiment.

FIG. 5 is a detailed schematic of a typical multiplier circuit used in FIG. 4. Specifically, the multiplier circuit 82a used to control the luminance of the independent red channel is illustrated, it being understood that similar circuits are employed for multipliers 80a–80f, 81a–81f, and 82b–82f. In the preferred embodiment, the multiplier circuit employs a type MC 1595L wide band monolithic four-quadrant multiplier 100 manufactured by Motorola, Inc., Phoenix, Ariz. The controlled parameter, R in FIG. 5, is provided through a current limiting resistor 101 to one of the inputs of the multiplier 100. The DC control level signal, R LUM in the described circuit, is provided through voltage divider resistors 102, 103 and through current-limiting resistor 104 to the other input of the multiplier. Capacitor 105 filters high frequency components to ground. Resistors 106, 107, and 109 are selected such that the product of the two input voltages is scaled by about one tenth, assuming that each of the input voltages ranges between zero and ten volts.

The output of multiplier 100 drives the base of an NPN transistor 108 which is used to isolate the output of the multiplier and drive the summing junction. Resistors 112, 113 provide biasing for the transistor 108. The emitter of transistor 108 is provided through a load resistor such as 85a, which is connected to the summing junction 86. It will now be appreciated that the circuit shown in FIG. 5 provides control means for separately varying the magnitude of the independent color video signals and for providing a controlled independent color video signal proportional to a DC control level such as R LUM.

Those skilled in the art will understand that the circuit in FIG. 5 can be slightly modified to serve as the multiplier circuits 81a–81f for the hue control shown in FIG. 4. In order to make this modification, an additional NPN transistor is connected to the negative output on pin 14 of the multiplier 100 by connecting the base through a resistor such as 112, connecting the collector to the positive power supply, and by connecting the emitter through a load resistor to the line to which the signal is to be coupled.

PARAMETER CONTROL APPARATUS

Figure 6:
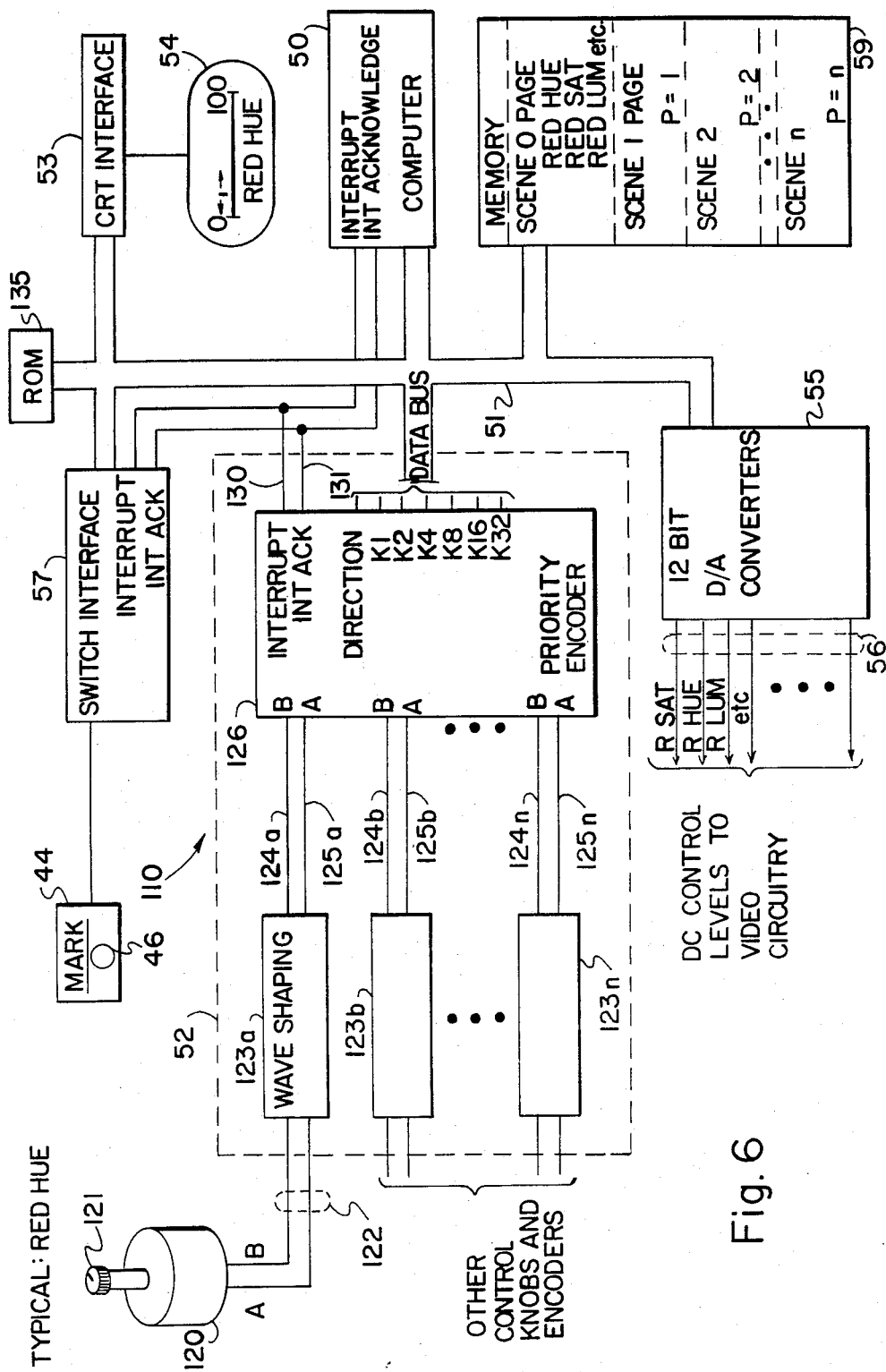
FIG. 6 is a schematic block diagram of the electronically-resettable parameter control apparatus of the present invention.

Turning now to FIG. 6, there will now be described the apparatus 110 of the preferred embodiment for controlling the controlled parameters such as hue, saturation, and luminance which in a color correction system require repetitive manual adjustments on a scene-by-scene basis. It will be understood that FIG. 6 is basically the system shown in FIG. 1 from which portions have been removed or added for clarity.

In the preferred embodiment, operator signal means responsive to actuation by an operator for indicating the amount of control desired are provided by a rotary position encoder 120. Although in the preferred embodiment, each of the controlled parameters is provided with a separate encoder, it will be understood that a single encoder can be provided to control a plurality of parameters, by multiplexing the output of the encoder such that only one parameter is controlled at a given time.

In FIG. 6 is shown a single encoder 120 which for purposes of discussion will be understood to be the hue control for the independent red channel. A knob 121 is coupled to the shaft of encoder 120 and allows the operator to rotate the shaft of the encoder. As will be understood by those skilled in the art, the rotary encoder 120 produces a bi-phase pulse output on lines 122 which can be analyzed as to amount and direction of rotation. In the control panel interface 52, a conventional wave-shaping circuit 123a receives the signals from the encoder on lines 122, and provides squared-up control signals on lines 124a and 125a.

The conditioned control signals on line 124a and 125a are basically an "amount" signal which represent an incremental amount of rotation of the shaft of the encoder, and a "direction" signal which represents the direction of rotation of the encoder shaft. Accordingly, each increment of rotation corresponds to a predetermined increment of control to be provided to the controlled parameter. Moreover, the direction of rotation indicates whether control is to be increased or decreased.

A wave shaping circuit is provided for encoder in the preferred embodiment. The outputs of these wave shaping circuits 123a–123n are provided on lines 124a–124n and 125a–125n to a priority encoder and direction detect circuit 126. This circuit is basically conventional, and provides the following functions: (1) receives pulses from the rotary encoder and provides a signal DIRECTION which indicates whether the knob is being turned clockwise for an increase in the controlled parameter, or counterclockwise for a decrease; (2) priority encodes the pulses so that a six-bit code indicative of the particular knob turned is present on outputs K1–K32; (3) generates an interrupt signal on line 130 to tell computer 50 that a knob has been turned; and (4) resets itself for additional rotary encoder pulses when the computer services the interrupt and provides an interrupt acknowledge signal on line 131. The preferred embodiment employs type 74LS348 priority encoders and various gates and latches to accomplish these functions.

Figure 9:
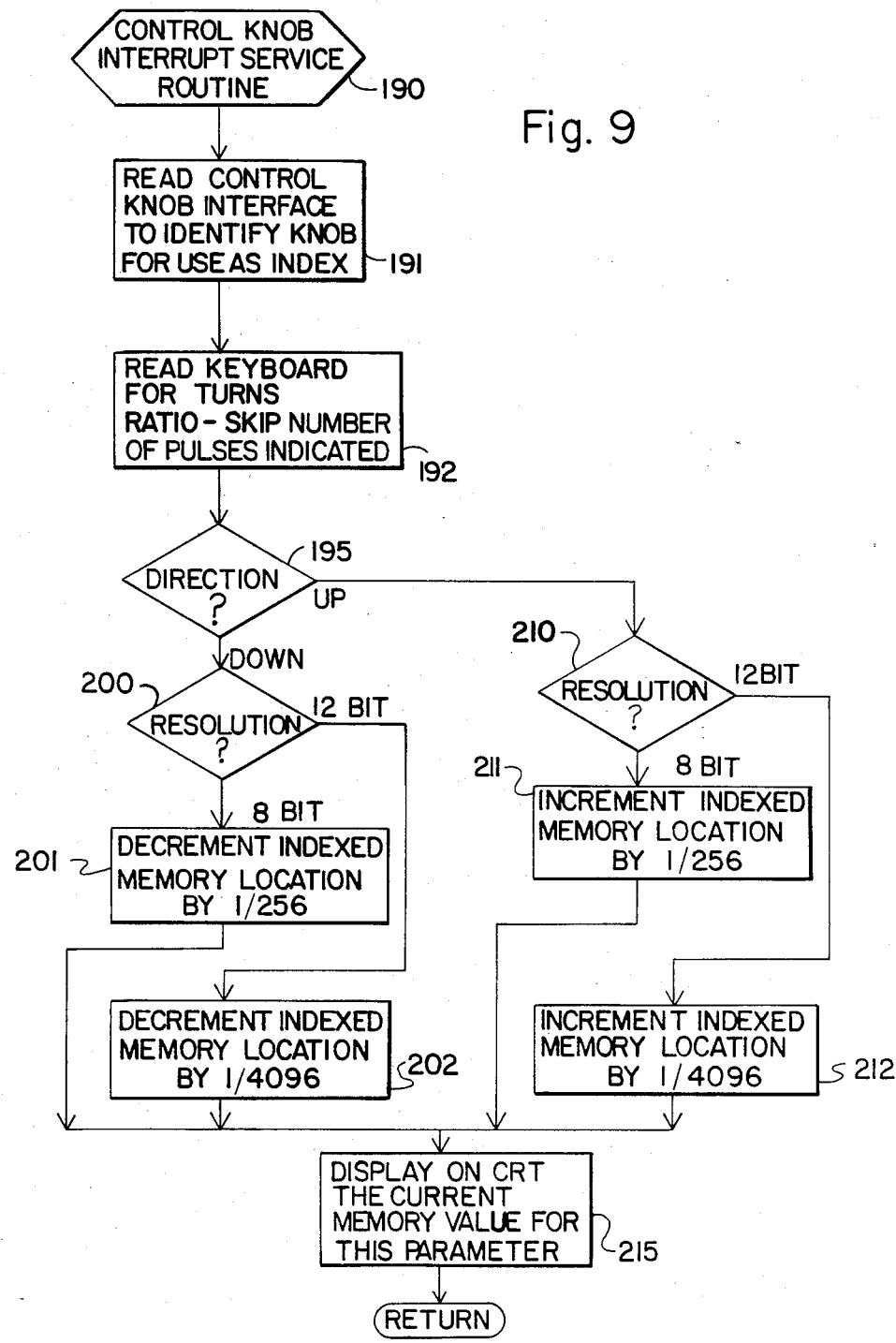

Control panel interface 52 is connected to data bus 51 and allows computer 50 to receive signals from the priority encoder circuit 126. In the preferred embodiment, each of the pulses provided on lines 124 and 125 causes an interrupt signal to be applied on line 130. For example, when a particular one of the control knobs is rotated, the pulses generate an interrupt to the computer which can then interrogate the control panel interface to determine which of the encoders has been rotated. A sample flow chart diagram for servicing this interrupt is shown in FIG. 9.

Computer 50 receives the direction signal and the amount signal from the adjustment of one of the control knobs and maintains a memory location for storing the accumulated pulses. For example, a separate memory location is maintained for the red hue pulse count for each scene or event for which a color correction is made. Each increment of rotation of encoder 120 causes the location maintained for the red hue pulse count to increase or decrease, depending upon the direction of rotation of the knob 121. Other locations are also maintained for other of the control parameters such as luminance, saturation, gain, gamma, and black level.

The contents of the memory locations are periodically provided over the data bus 51 to digital to analog (D/A) converters 55 during a D/A refresh, where the digital correction values are converted into an analog DC control voltage level. It will be understood that a separate memory location is maintained for each of the parameters controlled, and that a separate control signal such as R SAT, R LUM, R HUE, etc., is provided. It will also be understood that multiplexing techniques can be conveniently employed in conjunction with a sample-and-hold circuits whereby fewer D/A converters may be employed. The outputs of D/A converters 55 are then provided on lines 56 to the color balance and luminance correction circuitry 42 and the gamma, gain and black control circuits 31.

The contents of the correction value memory locations are also provided on data bus 51 to CRT interface 53 so that the operator may view on computer monitor 54 the effects of control. In the preferred embodiment, a display line with a moving cursor is provided for each of the controlled parameters, and as the operator turns a knob, the correction indicated is visibly present on the color monitor 28, and is displayed on the computer monitor 54 in real time. For example, should the red hue control knob 121 be turned, the cursor moves to the right as the red hue is increased, and is moved to the left to decrease the red hue.

Advantageously, with the system shown in FIG. 6 different scalings can be employed so that selectably variable control can be asserted over the controlled parameter. By selection of a number on key pad 58 (FIG. 1), which is also read by computer 50 over the Apple keyboard port, the operator can select settings wherein any number of turns of the knob moves the cursor from the minimum or zero setting to the maximum setting. For example, by entering a "4" on the key pad, the computer will count four pulses from the rotary position encoder before incrementing (or decrementing) the appropriate control parameter memory location. Any number of revolutions can be set in like manner to control the turns resolution.

Advantageously, and in accordance with the objects of the present invention, when the desired degree of control over the hue, saturation, luminance, or other parameters have been set to the operator's satisfaction, the system can be easily and quickly configured for a subsequent color correction in the following manner. Depression of the "mark" switch 46 provides a signal to computer 50 that the settings currently indicated by the state of the memory locations are "final" settings, and that the settings should now be associated with the event number. It will be understood that the event number is maintained by the system in a manner not related to the present invention. After the settings have been stored in association with the particular event number, computer 50 advances to a new page of memory which is provided for the subsequent correction. The system is thereby rendered ready to receive additional settings for a subsequent correction. Advantageously, no physical movement of the encoders or the knobs is required, since the resetting is done electronically and in computer memory. Accordingly, the system is ready for a subsequent color correction and will accept movement of the control knobs as indicative of new control amounts to be added.

In the preferred embodiment, a separate memory "page" or block of 128 bytes is provided for each scene or event. The various controlled parameters are then accessed within the page by indexing using the six-bit code provided on lines K1–K32 from priority encoder 126. Thus, rotation of a knob defines a particular memory location (1) in a page associated with the score or event number (and defined by the frame count of frame counter 29), (2) at an index number associated with the particular knob turned.

In initializing the system, initial mid-range correction values for all parameters are loaded from a read-only memory (ROM) 135 (FIG. 6) into the "scene 0" page. These correction values then provide the base from which the corrections for the first scene are made. At the end of the correction for the first scene, the corrected values are carried over and written into the page for the next scene, designated scene 1. These values serve as the base from which corrections for the second scene are made. In like fashion, the final correction values for a given scene serve as the base for corrections for the subsequent scene, since the operator most likely will desire that any subsequent scene corrections include the corrections made in the previous scene. FIG. 6 thus shows the memory 59 as divided into pages associated with scene numbers zero through n.

It will now be appreciated that the computer 50, with memory locations accessed as aforesaid, comprises means responsive to the direction signal and the amount signal for accumulating the net increase or decrease in a particular controlled parameter for a given scene or event. The depression of the "mark" switch, which generates a mark signal, denotes a command to advance the page referenced. Any corrections were made to the video scene prior to the mark signal will be stored in computer memory associated with the event number which was being viewed on the color monitor at the time of the depression of the mark switch 46. It will also be appreciated that there has been shown means responsive to the mark signal for conditioning the system to receive subsequent corrections for a subsequent event.

Figures 7, 8:
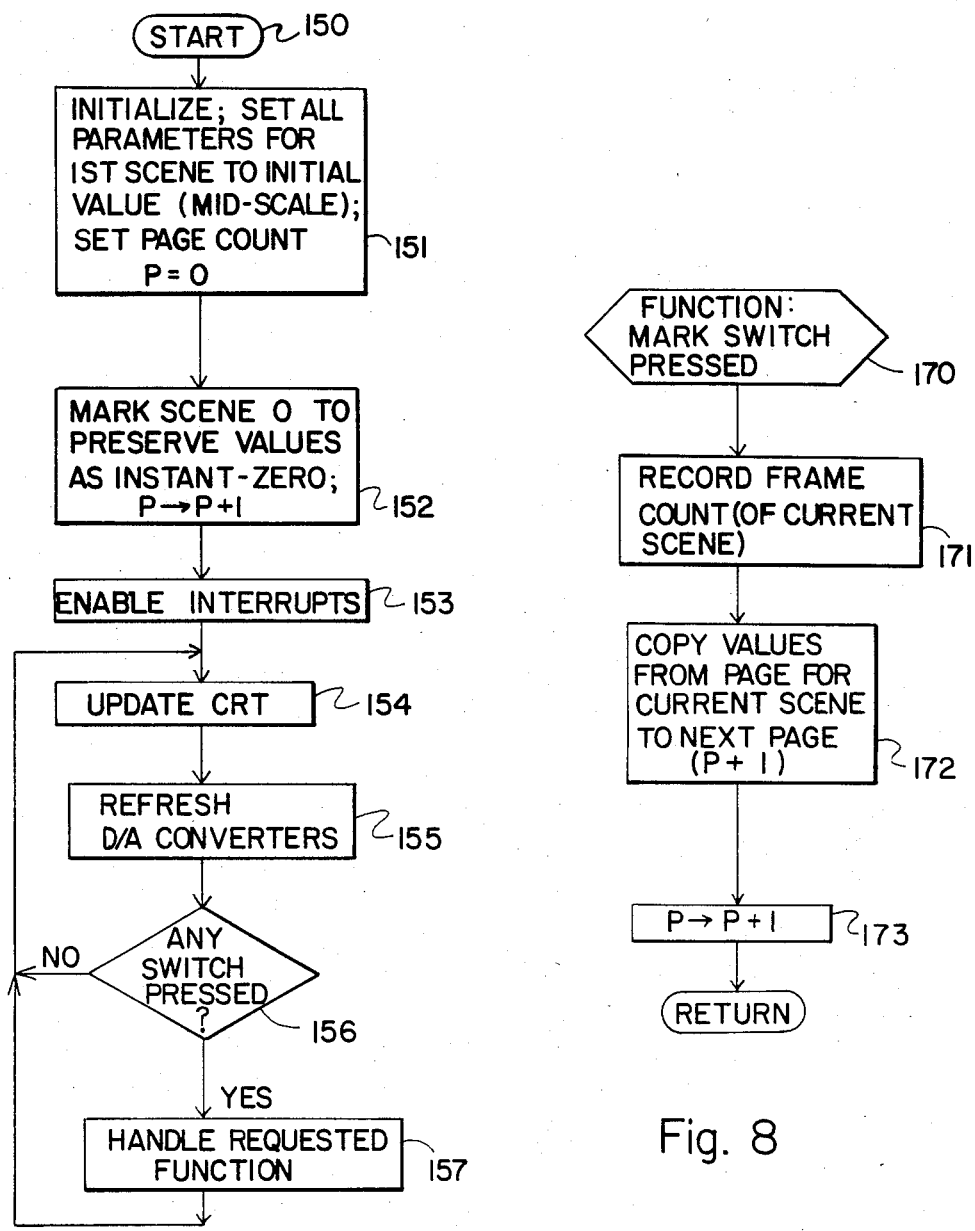
FIGS. 7, 8 and 9 are flow chart diagrams showing the steps taken by a computer to implement the parameter control apparatus of FIGS. 1 and 6.

The flow charts in FIGS. 7, 8 and 9 disclose the steps taken by computer 50 in order to accomplish these features. It will be understood by those skilled in the art that the flow chart represents a possible series of steps which may be taken to accomplish the objectives of the present invention, and that other sequences of steps may be employed with equal success in accomplishing control of the parameters. Furthermore, it will be understood that the diagrams illustrated in FIGS. 7, 8 and 9 may be implemented by means of hard-wired logic circuits in place of the microcomputer 50 while still successfully accomplishing the objectives of the invention. It will be further understood that the flow chart only illustrates the steps taken to accomplish the objectives of the present invention and are not intended to be a complete system flow chart for overall operation of the color correction system shown in FIG. 1, it being understood that such computerized color correction systems are known in the art.

Starting at 150, the computer first performs an initializing routine at 151 wherein the system is reset, and the page count P is set to zero. All parameters for the first scene are then set to an initial value by loading the values stored in ROM 135. Most of these values will be a mid-scale value which allows adjustment up or down.

At 152, the computer executes its own "mark" sequence in order to preserve the initial values in working memory. The values thus preserved are referred to as "scene zero", and by depressing switches on the switch panel 44 such as the preset chromaproc 48a, preset balance 48b, or preset luminance 48c, the initial values are then recalled and used as a starting point from which adjustments are made.

These same values are also copied to the memory page assigned to scene 1 to provide starting set of values which are then modified by the operator as the event may require. The page count P is advanced to the next number.

At 153, the interrupts are enabled, allowing the computer 50 to be responsive to movement of the control knobs on the control panel 45, or to the actuation of a switch. The servicing routine for the "mark" switch 46 is described in connection with FIG. 8.

At 154, the portion of the program which may be considered the main operating loop is entered, wherein the CRT display is updated. Memory values for the current scene are sent to the D/A converters at 155 in order to display the effects of any changes which may have been caused by the interrupt servicing routine.

At 156, the switches in the switch panel 44 are polled to determine if any function is being requested. If not, the main operating loop is repeated until interrupted or until a switch is pressed. Upon the depression of a switch, the requested function is handled at 157.

For example, FIG. 8 shows the subroutine at 170 which is executed when the mark switch 46 is depressed. At 171, the frame count of the current scene is read from the frame counter or SMPTE time code reader 29 in order to identify the current scene. At 172, the controlled parameter values from the page for the current scene are copied to the next page (P+1) so as to provide a starting point for corrections for the next scene. Then, at 173, the page count is increased so that subsequent corrections are entered in memory locations associated with the next scene for which corrections are to be made. After performing this task, the subroutine returns to the main operating loop.

FIG. 9 illustrates the interrupt servicing routine which is executed for each incremental rotation of one of the control knobs. It will be recalled that each pulse produced by the rotation of a control knob causes an interrupt to be requested. Entering the routine at 190, the first step taken at 191 is to read the control knob interface (the output of priority encoder 126) so as to identify the knob which has produced the interrupt request. The six-bit code which identifies the particular knob then serves as the index which accesses a particular memory location within the current page.

At 192, the keyboard register is read to obtain a turns ratio. If a number has been entered on keyboard 58, there will be a number available for use as a count of the number of pulses to be skipped before incrementing or decrementing the memory location for the particular control knob. For example, if the number "three" has been entered, the routine will skip three interrupts from that particular control knob before incrementing or decrementing the appropriate memory location. In this fashion, it will be appreciated that the "feel" of the control knob to the operator is such that a greater amount of rotation is required before the effect of the rotation is observed in the controlled parameter, indicated on the scene being displayed and on the moving cursor which indicates the amount of control being exercised.

At 195, the DIRECTION signal from the control panel interface 52 is read to determine whether the control knob has been rotated clockwise or counterclockwise, indicating an increase or decrease in control. If a decrease has been indicated, the program goes to 200. An inquiry is made whether eight or twelve bit resolution is desired by determining whether the ratio switch 47 has been depressed. If eight bit resolution is desired, at 201 the indexed memory location is decremented by 1/256, while if a twelve bit resolution has been requested, at 202 the indexed memory location is decremented by 1/4096.

If the amount of control is an indicated increase, from 195 the program goes to 210, and the inquiry is again made whether eight or twelve bit resolution has been requested. If eight bit resolution has been requested, at 211 the indexed memory location is incremented by 1/256, while if twelve bit resolution has been requested, the indexed memory location is incremented by 1/4096 at 212.

After either incrementing or decrementing the appropriate memory location, the next step taken at 215 is to display on the CRT the current value of the controlled parameter stored in the indexed memory location for the particular parameter over which control has been indicated. The subroutine then exits and returns control of the program to the main operating loop, where other functions can be accomplished.

The preferred embodiment of the present invention has been disclosed by way of example and it will be understood that other modifications may occur to those skilled in the art without departing from the scope and the spirit of the appended claims.

I claim:

1. In a system for controlling electrical parameters requiring repetitive adjustments, apparatus for controlling a controlled parameter of of an event for each one of a plurality of events, comprising:

operator signal means responsive to actuation by an operator for providing control signals indicative of a desired increase or decrease in the controlled parameter, said control signals being provided upon actuation from an indeterminate initial setting to a second setting displaced relative to said initial setting;

addressable memory means, including a plurality of addressable memory locations, for storing said control signals in a predetermined one of said memory locations;

mark signal means for providing a mark signal in response to actuation by an operator indicative that control signals provided by said operator signal means subsequent to said mark signal are associated with an event subsequent to said mark signal; and control means responsive to a first mark signal to cause said memory means to store control signals provided by the actuation of said operator signal means from said initial setting to said second setting in a first memory location associated with a first event, and further responsive to a second mark signal subsequent to said first mark signal to store control signals provided by the actuation of said operator signal means from said second setting to a third setting displaced relative to said second setting in a second memory location associated with a second event, whereby the apparatus is rendered operative to control the controlled parameter for said second event without requiring physical movement or physical resetting of the operator signal means from the second setting back to the initial setting.

2. The apparatus of claim 1, wherein said operator signal means comprises a rotary position encoder responsive to provde a plurality of pulses upon the rotation of a shaft by an operator, and further comprising:

encoder interface circuit means responsive to said pulses to provide said control signals as a direction signal indicative of a desired increase or decrease in the controlled parameter, and an amount signal indicative of a predetermined incremental amount of change for the controlled parameter.

3. The apparatus of claim 2, wherein said direction signal is a digital signal having a first logic level upon clockwise rotation of said encoder shaft and a second logic level upon counterclockwise rotation of said shaft.

4. The apparatus of claim 2, wherein said control means is responsive to said amount signal to increment or decrement the memory location associated with a particular event upon each occurrence of said amount signal.

5. The apparatus of claim 1, wherein said memory means and said control means comprise programmed digital computer means responsive to said control signals to alter the contents of a particular one of said memory locations associated with the controlled parameter to provide a digital control signal.

6. The apparatus of claim 5, wherein said computer means is responsive to store a first plurality of said control signals for said first event in a first predefined block of memory and is thereafter responsive to store a second plurality of said control signals for said second event in a second predefined block of memory.

7. An apparatus for operator control of an electrical parameter for a plurality of events without requiring physical movement or resetting of a control for each controlled event, comprising:

operator control means for providing electrical control signals indicative of a desired increase or decrease in the controlled parameter in response to actuation by an operator;

mark signal means for providing a mark signal in response to actuation by the operator; and control circuit means responsive to associate said control signals occurring in response to movement of said control means from an indeterminate initial position to a second position prior to said mark signal with a first controlled event, and to associate said control signals occurring in response to movement of said control means from said second position to a third position subsequent to said mark signal with a subsequent, second controlled event.

8. The apparatus of claim 7, wherein said operator control means comprises a rotary position encoder.

9. The apparatus of claim 7, wherein said control circuit means comprises a programmed digital computer.

10. The apparatus of claim 1, wherein said system is a scene-by-scene color corrector.

11. The apparatus of claim 1, wherein said plurality of events comprises a plurality of scenes in a scene-by-scene color corrector.

12. The apparatus of claim 1, wherein said controlled parameter is hue, saturation, luminance, gain, gamma, or black level in a video signal color correction system.

13. The apparatus of claim 7, wherein said plurality of events comprises a plurality of scenes in a scene-by-scene color corrector.

14. The apparatus of claim 7, wherein said electrical parameter is hue, saturation, luminance, gain, gamma, or black level in a video signal color correction system.

* * * * *